United States Patent
Ghannadian et al.

(10) Patent No.: US 7,639,613 B1
(45) Date of Patent: Dec. 29, 2009

(54) ADAPTIVE, FLOW-BASED NETWORK TRAFFIC MEASUREMENT AND MONITORING SYSTEM

(75) Inventors: Farzad Ghannadian, San Jose, CA (US); Li Fang, San Jose, CA (US); Michael J. Quinn, Campbell, CA (US)

(73) Assignee: Packeteer, Inc., Cupertino, CA (US)

( * ) Notice: Subject to any disclaimer, the term of this patent is extended or adjusted under 35 U.S.C. 154(b) by 770 days.

(21) Appl. No.: 11/166,837

(22) Filed: Jun. 24, 2005

(51) Int. Cl.
*H04L 12/28* (2006.01)

(52) U.S. Cl. .................. 370/232; 370/412; 370/432; 370/236; 370/392

(58) Field of Classification Search .............. 709/232, 709/236, 238, 224; 370/229–236
See application file for complete search history.

(56) References Cited

U.S. PATENT DOCUMENTS

| | | | |
|---|---|---|---|
| 6,046,980 A | 4/2000 | Packer | |
| 6,751,627 B2 | 6/2004 | Sternin | |
| 6,768,739 B1 | 7/2004 | Kobayashi et al. | |
| 7,010,611 B1 * | 3/2006 | Wiryaman et al. | 709/232 |
| 7,248,585 B2 * | 7/2007 | Kohn et al. | 370/392 |
| 2002/0078226 A1 * | 6/2002 | Kato et al. | 709/236 |
| 2002/0143939 A1 * | 10/2002 | Riddle et al. | 709/224 |
| 2003/0065812 A1 * | 4/2003 | Beier et al. | 709/236 |
| 2003/0110276 A1 * | 6/2003 | Riddle | 709/238 |
| 2006/0168328 A1 * | 7/2006 | Shimada et al. | 709/238 |

* cited by examiner

*Primary Examiner*—Derrick W Ferris
*Assistant Examiner*—Jose Villa
(74) *Attorney, Agent, or Firm*—Baker Botts L.L.P.

(57) ABSTRACT

Methods, apparatuses and systems directed to an adaptive network traffic monitoring and measurement system. In one implementation, the present invention provides a measurement engine that monitors data flows on the packet processing path of a network device and executes measurement policy that control the granularity with which measurement data is recorded. In one implementation, the present invention provides a filtering and aggregation mechanism that can seamlessly adapt to changes in measurement policy configuration.

20 Claims, 4 Drawing Sheets

ADAPTIVE, FLOW-BASED NETWORK TRAFFIC MEASUREMENT AND MONITORING SYSTEM

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/306,678 now U.S. Pat. No. 6,460,085 in the name of Jerome D. Toporek, Jeremy A. McCooey, Marc B. Hasson, and Timothy W. Hartrick, entitled "Method and System for Managing Memory in an Internet over Satellite Connection;"

U.S. patent application Ser. No. 09/243,185 now U.S. Pat. No. 6,529,477 in the name of Jerome D. Toporek, David C. Palter, Jeremy A. McCooey, Marc B. Hasson, Timothy W. Hartrick, and Kay A. Guyer, entitled "Internet over Satellite System;"

U.S. patent application Ser. No. 09/198,051, now abandoned, in the name of Guy Riddle, entitled "Method for Automatically Determining a Traffic c Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, now abandon, in the name of Todd Krautkremer and Guy Riddle, entitled "Application Service Level Mediation and Method of Using the Same;"

U.S. patent application Ser. No. 09/966,538, now U.S. Pat. No. 7,406,522, in the name of Guy Riddle, entitled "Dynamic Partitioning of Network Resources;"

U.S. patent application Ser. No. 10/039,992, now U.S. Pat. No. 7,032,072, in the name of Michael J. Quinn and Mary L. Laier, entitled "Method and Apparatus for Fast Lookup of Related Classification Entities in a Tree-Ordered Classification Hierarchy;"

U.S. patent application Ser. No. 10/108,085, now abandon, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, now U.S. Pat. No. 7,433,304, in the name of Brett Galloway and George Powers, entitled "Classification Data Structure enabling Multi-Dimensional Network Traffic Classification and Control Schemes;"

U.S. patent application Ser. No. 10/334,467, now U.S. Pat. No. 7,292,531, in the name of Mark Hill, entitled "Methods, Apparatuses and Systems Facilitating Analysis of the Performance of Network Traffic Classification Configurations;"

U.S. patent application Ser. No. 10/453,345, now abandon, in the name of Scott Hankins, Michael R. Morford, and Michael J. Quinn, entitled "Flow-Based Packet Capture;"

U.S. patent application Ser. No. 10/812,198, now U.S. Pat. No. 7,496,661, in the name of Michael Robert Morford and Robert E. Purvy, entitled "Adaptive, Application-Aware Selection of Differentiated Network Services;"

U.S. patent application Ser. No. 10/843,185, now U.S. Pat. No. 7,376,080, in the name of Guy Riddle, Curtis Vance Bradford and Maddie Cheng, entitled "Packet Load Shedding;"

FIELD OF THE INVENTION

The present invention relates to computer networks and, more particularly, to network traffic measurement and monitoring systems.

BACKGROUND OF THE INVENTION

Efficient allocation of network resources, such as available network bandwidth, has become critical as enterprises increase reliance on distributed computing environments and wide area computer networks to accomplish critical tasks. The widely-used TCP/IP protocol suite, which implements the world-wide data communications network environment called the Internet and is employed in many local area networks, omits explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily. The above-identified U.S. Patents and patent applications provide explanations of certain technical aspects of a packet based telecommunications network environment, such as Internet/Intranet technology based largely on the TCP/IP protocol suite, and describe the deployment of bandwidth management solutions to monitor and/or manage network environments using such protocols and technologies.

Effective management of such networks often requires regular monitoring and collection of data characterizing various attributes of the network, its operation and/or the traffic flowing through it. For example, Cisco Systems, Inc. of San Jose, Calif. offers a feature set of data monitoring and collection technologies in connection with its routers, called Netflow®. The Cisco IOS® NetFlow feature set allows for the tracking of individual IP flows as they are received at a router or switching device. According to the technology, after a flow has terminated, a suitably configured router or switch generates a NetFlow record characterizing various attributes of the flow. The NetFlow record is ultimately transmitted as a datagram to a NetFlow Data Collector that stores and, optionally, filters the record. A NetFlow Record includes a variety of attributes, such as source and destination IP addresses, packet count, byte count, start and end time stamps, source and destination TCP/UDP ports, Quality of Service attributes, and routing-related information (e.g., nexthop and Autonomous System (AS) data). Such NetFlow® records are similar to call records, which are generated after the termination of telephone calls and used by the telephone industry as the basis of billing for long distance calls, for example.

Furthermore, most network devices maintain data characterizing utilization, operation and/or performance of the network devices, and/or the network on which the devices operate, in limited, volatile memory, rather than using persistent storage (e.g., hard disks or other non-volatile memory). Consequently, network management applications commonly use the Simple Network Management Protocol (SNMP) to poll network devices (using the Management Information Base (MIB) associated with the network device) at regular time intervals and maintain the sampled raw data in a persistent data store. The network management application, such as a reporting package, then processes the raw data to allow for the creation of reports derived from the raw data detailing operation and/or performance of the device and/or the network. Management Information Bases typically contain low-level information characterizing the operation of the network device, such as the number of bytes or packets encountered on an interface, and do not provide information concerning the characteristics of data flows. Using a reporting package, a network administrator may then analyze the data to yield information about the performance or utilization of the network and/or network devices associated with the network. Indeed, various applications can then access and analyze the collected data for a variety of purposes, including accounting, billing, network planning, traffic engineering, and user or application monitoring.

Packeteer, Inc. of Cupertino, Calif. develops application traffic monitoring, management, and reporting software and systems. Its PacketSeeker® systems and PacketShaper® application traffic management devices, among other things, provide flow- and application-aware monitoring of network traffic enabling classification of network traffic flows on a per-application basis. The Packetshaper® application traffic management device, for example, includes functionality allowing for classification of network traffic based on information from layers 2 to 7 of the OSI reference model. As discussed in the above-identified patents and patent applications, the application traffic management device may include a measurement engine operative to record or maintain numeric totals of a particular measurement variable at periodic intervals on a per-application or other traffic classification basis. The application traffic management device further includes a management information base including standard network objects maintaining counts relating, for example, to the operation of its network interfaces and processors. Packeteer's ReportCenter™ leverages the powerful network utilization and application performance statistics available in Packetshaper® bandwidth management devices and offers a centralized reporting platform to monitor and manage large deployments efficiently by streamlining collection, collation, storage, analysis, and distribution of measured statistics.

As described above, the measurement engine operates similarly to a standard management information base in that various statistics and counters are maintained for a plurality of traffic classes or types. For example, the measurement engine can record the number of inbound and outbound packets, as well as the number of bytes, traversing a network device on an aggregate, application, and/or traffic class level. Other network statistics can include the number of TCP packets, the number of retransmitted TCP packets, the peak number of active TCP flows or other connections, etc. The measurement engine may also maintain data relating to configuration of an application traffic management device, such as the number of bandwidth partitions, the byte count in a given partition, the packet count in a given partition, the TCP data packet count in a given partition, the TCP retransmit packet count in a given partition, the TCP tossed retransmit packet count in a given partition, the peak number of active TCP flows in the partition, the total time in seconds spent over the partition size for the partition. The measurement engine may also maintain data relating to traffic classes, such as, for a given traffic class: the packet count in the traffic class, the TCP data packet count in the class, the TCP retransmit packet count in the class, and the peak number of active TCP flows in the class. In most implementations, the measurement engine maintains such values in volatile memory (in a table or other data structure) and, at periodic intervals, stores the data in persistent memory, such as a hard drive, with a time stamp and clears the network statistic values in the volatile memory space.

While the measurement engine is sufficient to achieve its intended purpose, the granularity of the data maintained by the measurement engine is generally limited to traffic classes and partitions. Often times, however, it is desirable to obtain a more granular view of the network traffic. For example, the measurement engine does not allow for isolation of specific hosts on the network. Furthermore, the table or other data structure used to record the measurement engine data is relatively static. Adding a new basis of classification to the measurement engine, therefore, would require reconfiguring the cache table of the measurement engine and a loss of the data previously maintained. This circumstance, therefore, limits the application of dynamic or adaptive measurement policies that could be implemented in response to a detected event.

In light of the foregoing, a need in the art exists for methods, apparatuses and systems that allow for, or facilitate, dynamic or adaptive measurement systems. In addition, a need exists for methods, apparatuses and systems that allow for collection of more granular network traffic data. Embodiments of the present invention substantially fulfill these needs.

SUMMARY OF THE INVENTION

The present invention provides methods, apparatuses and systems directed to an adaptive network traffic monitoring and measurement system. In one implementation, the present invention provides a measurement engine that monitors data flows on the packet processing path of a network device and executes measurement policy that control the granularity with which measurement data is recorded. In one implementation, the present invention provides a filtering and aggregation mechanism that can seamlessly adapt to changes in measurement policy configuration. These and other objects and/or features of various embodiments of the present invention will become apparent from the description and drawings that follow.

DESCRIPTION OF PREFERRED EMBODIMENT(S)

A. Network Environment and Device Configuration

Figure 1:
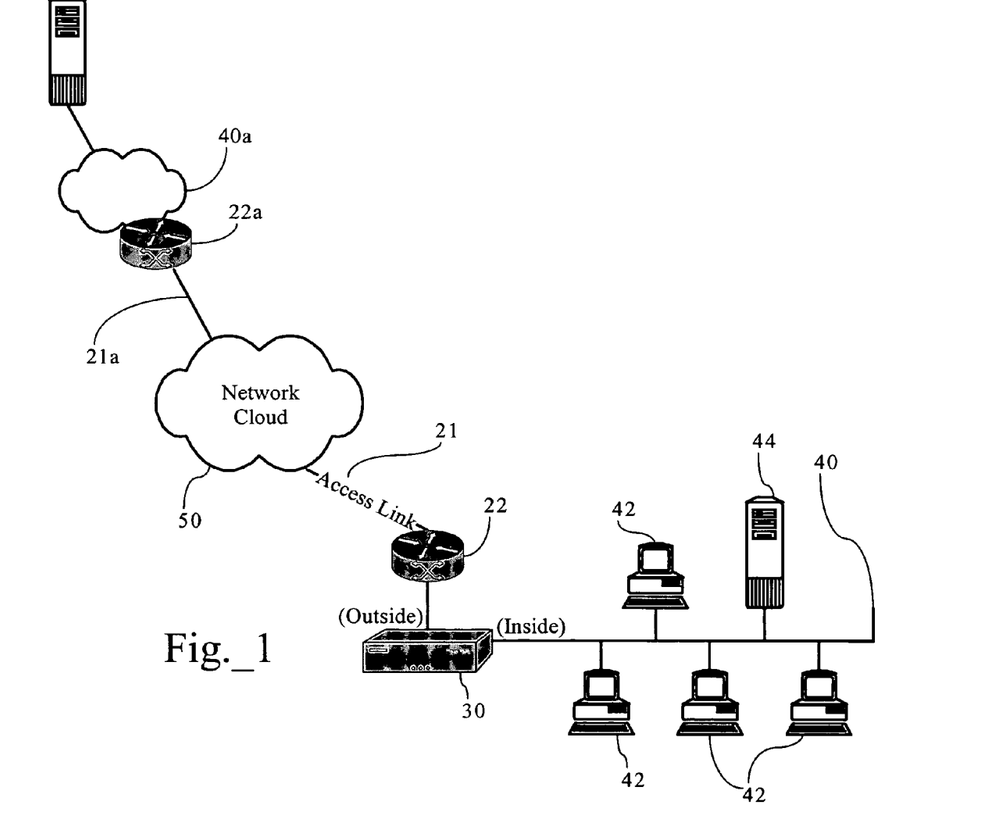
FIG. 1 is a functional block diagram illustrating a computer network environment including a network traffic monitoring device according to an embodiment of the present invention.
Figure 2:
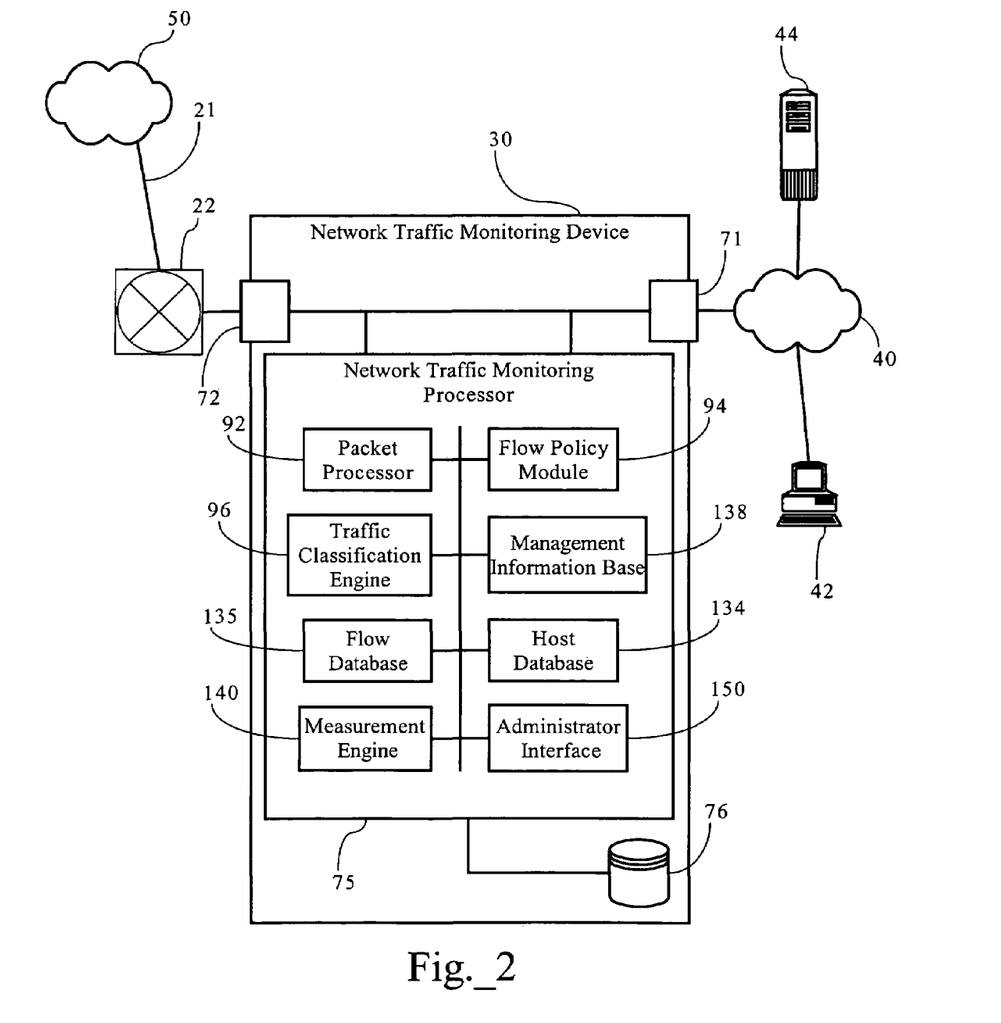
FIG. 2 is a functional block diagram setting forth the functionality in a network traffic monitoring device according to an embodiment of the present invention.

FIGS. 1 and 2 illustrate an exemplary network environment in which an embodiment of the present invention operates. Of course, the present invention can be applied to a variety of network architectures. FIG. 1 illustrates, for didactic purposes, a network 50, such as wide area network, interconnecting a first enterprise network 40, supporting a central operating or headquarters facility, and a second enterprise network 40a, supporting a branch office facility. Network 50 may also be operably connected to other networks associated with the same administrative domain as networks 40, 40a, or a different administrative domain. As FIG. 2 shows, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols, and/or other suitable protocols, and has a plurality of interconnected digital packet transmission stations or routing nodes. Networks 40 & 40a, can each be a local area network, a wide area network, or any other suitable network.

As FIGS. 1 and 2 illustrate, network traffic monitoring device 30, in one implementation, is deployed at the edge of network 40. In one implementation, network traffic monitoring device 30 is operative to classify and manage data flows traversing access link 21. However, the traffic monitoring functionality according to the present invention can be integrated into a variety of network devices, such as proxies, firewalls, packet capture or network monitoring equipment, VPN servers, web services network gateways or brokers, and the Like.

As FIG. 2 illustrates, network traffic monitoring device 30, in one implementation, comprises network traffic monitoring processor 75, and first and second network interfaces 71, 72, which operably connect network traffic monitoring device 30 to the communications path between router 22 and network 40. Network traffic monitoring processor 75 generally refers to the functionality implemented by network traffic monitoring device 30, such as network monitoring or reporting, network application traffic management, and the like. In one embodiment, network traffic monitoring processor 75 is a combination of hardware and software, such as a central processing unit, memory, a system bus, an operating system, device drivers, and one or more software modules implementing the functions performed by network traffic monitoring device 30, as well as the network monitoring and measurement functionality described herein. In one implementation, network traffic monitoring device 30 is configured to manage network traffic traversing access link 21 in addition to the monitoring and measurement functions described herein. The above-identified patents and patent applications, incorporated by reference herein, disclose various functionalities and features that may be incorporated into application traffic management devices according to various implementations of the present invention.

In one embodiment, first and second network interfaces 71, 72 are the hardware communications interfaces that receive and transmit packets over the computer network environment. In one implementation, first and second network interfaces 71, 72 reside on separate network interface cards operably connected to the system bus of network traffic monitoring device 30. In another implementation, first and second network interfaces reside on the same network interface card. In addition, the first and second network interfaces 71, 72 can be wired network interfaces, such as Ethernet (IEEE 802.3) interfaces, and/or wireless network interfaces, such as IEEE 802.11, BlueTooth, satellite-based interfaces, and the like. As FIG. 2 illustrates, network traffic monitoring device 30, in one embodiment, includes persistent memory 76, such as a hard disk drive or other suitable memory device, such writable CD, DVD, or tape drives. In other implementations, network traffic monitoring device 30 can include additional network interfaces, beyond network interfaces 71 and 72, to support additional access links or other functionality. Furthermore, U.S. application Ser. No. 10/843,185 provides a description of the operation of various modules, such as network interface drivers, and data structures for receiving into memory and processing packets encountered at network interfaces 71, 72.

As FIG. 2 illustrates, network traffic monitoring processor 75, in one implementation, includes a packet processor 92, flow policy module 94, and traffic classification engine 96. Network traffic monitoring processor 75, in one implementation, further comprises host database 134, flow database 135, measurement engine 140, management information base 138, and administrator interface 150. In one embodiment, the packet processor 92 is operative to process data packets, such as detecting new data flows, parsing the data packets for various attributes (such as source and destination addresses, and the like) and storing packet attributes in a buffer structure, and maintaining one or more flow variables or statistics (such as packet count) in connection with the data flows and/or the source/destination hosts. The traffic classification engine 96, as discussed more fully below, is operative to classify data flows based on one or more attributes associated with the data flows. Traffic classification engine 96, in one implementation, stores traffic classes associated with data flows encountered during operation of network traffic monitoring device 30, as well as manually created traffic classes configured by a network administrator, in a hierarchical traffic class structure. In one embodiment, traffic classification engine 96 stores traffic classes, in association with pointers to traffic management policies or pointers to data structures defining such traffic management policies. Traffic classification engine 96, in one implementation, is supported by a plurality of service type identification modules that classify network traffic into a variety of protocols, services and network applications, as discussed more fully below. In one implementation, flow policy module 94 is operative to apply bandwidth utilization controls to data flows traversing the access link 21 in the inbound and/or outbound directions. In one implementation, flow policy module 94 is also operative to associate a measurement tag to data flows based on a set of matching rules or other criterion.

As discussed above, in one implementation, network traffic monitoring processor 75 further comprises measurement engine 140, management information base (MIB) 138, and administrator interface 150. Management information base 138 is a database of standard and extended network objects related to the operation of network traffic monitoring device 30. Measurement engine 140, as discussed in more detail below, maintains measurement and statistical data relating to operation of network traffic monitoring device 30 to allow for monitoring of bandwidth utilization and network performance across access link 21 with respect to a plurality of bandwidth utilization and other network statistics.

Administrator interface 150 facilitates the configuration of network traffic monitoring device 30 to adjust or change operational and configuration parameters associated with the device. For example, administrator interface 150 allows administrators to select identified traffic classes and associate them with traffic management policies. Administrator interface 150 also displays various views associated with a hierarchical traffic classification scheme and allows administrators to configure or revise the hierarchical traffic classification scheme. Administrator interface 150 also allows users to configure measurement policy applied by measurement engine 140. Administrator interface 150 can provide a command line interface and/or a graphical user interface accessible, for example, through a conventional browser on client device 42.

A.1. Packet Processing

As discussed above, packet processor 92, in one implementation, is operative to detect new data flows, instantiate data structures associated with the flows and parse packets to identify packet attributes, such as source and destination addresses, port numbers, etc., and populate one or more fields in the data structures. In one embodiment, when packet processor 92 encounters a new data flow it stores the source and destination IP addresses contained in the packet headers in host database 134. Packet processor 92 further constructs a flow object in flow database 135 including attributes characterizing a specific flow between two end systems, such as source and destination addresses, port numbers, etc. Other flow attributes in the flow object may include application specific attributes gleaned from layers above the TCP layer, such as codec identifiers for Voice over IP calls, Citrix database identifiers, and the like. Packet processor 92 also stores meta information relating to the received packets in a packet buffer—a memory space, typically in dynamic random access memory (DRAM), reserved for packets traversing network traffic monitoring device 30. In one embodiment, the packets are stored in the packet buffer with a wrapper including various information fields, such as the time the packet was received, the packet flow direction (inbound or outbound), and a pointer to the flow object corresponding to the flow of which the packet is a part.

In typical network deployments, the majority of data flows are generally TCP or UDP flows. However, any suitable transport layer flow can be recognized and detected. As discussed more fully below, in one embodiment, flows are identified based on the following flow attributes: 1) source IP address, 2) destination IP address, 3) source port number, 4) destination port number, and 5) protocol (derived from the "protocol" field in IPv4 headers, and the "NextHeader" field in IPv6 headers). One skilled in the art will recognize that flows can be identified in relation to a variety of attributes and combinations of attributes. In addition, methods for determining new data flows and assigning packets to existing data flows are well known in the art and also depend on the particular transport layer protocol employed. For a TCP flow, for example, packet processor 92 can determine a new data flow by detecting SYN, SYN/ACK, and/or ACK packets. However, a new data flow, depending on the network protocol associated with the flow, can simply be a data flow for which there is no corresponding flow object. For example, with UDP and GRE flows (where there is no explicit connection or handshake mechanism), a new flow is recognized by associating the source and destination addresses and port numbers to the flow and the flow type (e.g., UDP, GRE, etc.). Accordingly, when a UDP packet identifies a new address/port pair, the attributes discussed above are stored in a data structure along with the time of last packet. A new UDP flow between the same address/port pairs can be determined by comparing the last packet time to a threshold value (e.g., 2 minutes). If the difference between the time of the last packet and the time of the current packet is greater than the threshold, the current packet is deemed part of a new flow. In another implementation, a background and/or separate process can periodically compare the last packet times associated with a flow to a threshold period of time and deem the flow terminated if the last packet time is beyond the threshold period of time. The termination of TCP connections is typically detected by identifying FIN packets; however, the timeout mechanisms discussed above can be used in situations where a FIN packet is not detected.

In one embodiment, a flow object contains, as discussed above, such attributes as pointers to the "inside" and "outside" IP addresses in host database 134, as well as other flow specification parameters, such as inside and outside port numbers, service type (see below), protocol type and other parameters characterizing the data flow. In one embodiment, such parameters can include information gleaned from examination of data within layers 2 through 7 of the OSI reference model. U.S. Pat. Nos. 6,046,980 and U.S. Pat. No. 6,591,299, as well as others incorporated by reference herein, disclose classification of data flows for use in a packet-based communications environment. FIGS. 1 and 2 illustrate the concept associated with inside and outside addresses, where network interface 71 is the "inside" network interface and network interface 72 is the "outside" network interface. As discussed above, in one embodiment, a flow object includes an "inside" and "outside" address relative to network traffic monitoring device 30. See FIG. 1. For a TCP/IP packet, packet processor 92 can compute the inside and outside addresses based on the source and destination network addresses of the packet and the direction of the packet flow. Still further, packet processor 92 can also identify which host is the client and which host is the server for a given data flow and store this information in the flow object. The identification of a server or client in a given transaction generally depends on the network protocols employed by the hosts. For example, in TCP flows, a client initiates a transaction by transmitting a SYN packet to initiate a TCP connection. Network traffic monitoring device 30 can detect the SYN packet and note the source network address of the packet as the client host, and the destination address as the server host. One of ordinary skill in the art will recognize how to identify clients and servers in connection with other networking protocols.

In one embodiment, packet processor 92 creates and stores flow objects corresponding to data flows in flow database 135. In one embodiment, flow object attributes include pointers to objects in host database 134, as well as other flow state parameters, such as TCP connection status, timing of last packets in the inbound and outbound directions, speed information, apparent round trip time, packet count, etc. Flow object attributes further include, at least one service type identifier, at least one traffic class identifier (or pointer(s) thereto) associated with the data flow, as well as policy parameters (or pointers thereto) corresponding to the identified traffic class. In one embodiment, to facilitate association of an existing flow object to subsequent packets associated with a data flow or connection, flow database 135 further maintains a control block hash table including a key comprising a hashed value computed from a string comprising the inside IP address, outside IP address, inside port number, outside port number, and protocol type (e.g., TCP, UDP, etc.) associated with a pointer to the corresponding flow object. According to this embodiment, to identify whether a flow object exists for a given data flow, packet processor 92 hashes the values identified above and scans the hash table for a matching entry. If one exists, packet processor 92 associates the pointer to the corresponding flow object with the packets in the data flow.

A.2. Traffic Classification Engine

Traffic classification engine 96 is operative to inspect flow object attributes, as well as packets in the corresponding data flows, and apply matching rules corresponding to a plurality of traffic classes. Traffic classification engine 96, in one implementation, comprises a plurality of service type identification modules, each of which correspond to a set of service types. Each service type identification module analyzes one or more packets in a given data flow to attempt to identify a service type corresponding to the flow. A service type, in one implementation, can be a network protocol, a service, or a network-application. For example, one service type identification module can correspond to a network application, such as Citrix®, while another service type identification module can be dedicated to detecting Oracle® or PostgreSQL database traffic. Still other service type identification modules can classify HTTP flows, FTP flows, ICMP flows, RTP flows, NNTP, SMTP, SSL, DICOM and the like. In one implementation, traffic classification engine 96 passes pointers to received packets to each service type identification module, which then inspect the packets stored in the buffer memory. In one implementation, each service type identification module has an associated packet count threshold (in the aggregate, packets from server to client, or client to server) after which it no longer attempts to classify a data flow. In one implementation, the packet count threshold will vary across the service type identification modules. For example, a service type identification module dedicated to classifying Citrix® traffic may be able to classify a data flow with certainty after three packets. In many instances, network traffic monitoring device 30 may have to encounter more than one packet corresponding to a data flow in order to finally classify the data flow. For example, the initial TCP handshake packets may only reveal IP address, port numbers and protocol identifiers. While this information may be sufficient to identify HTTP traffic, for example, additional packets (such as data packets) may reveal a more specific network application, such as an accounting application or peer-to-peer file sharing application, that utilizes HTTP. Accordingly, in one implementation, each service type identification module responds to receiving a pointer to a packet by 1) reporting a matching service type identifier and the desire to inspect more packets in the flow (to possibly identify a more specific service type identifier); 2) reporting a matching service type and no interest in inspecting subsequent packets in the flow; 3) reporting no matching service type identifier and the desire to inspect more packets in the flow; and 4) reporting no matching service type and no interest in inspecting subsequent packets in the flow.

To allow for identification of service types (e.g., FTP, HTTP, etc.), traffic classification engine 96, in one embodiment, is supported by one to a plurality of service identification tables in a relational database that allow for identification of a particular service type (e.g., application, protocol, etc.) based on the attributes of a particular data flow. Of course, other suitable data structures can be used to support the identification of service types, such as a set of hard-coded instructions, an XML file, and the like. In one embodiment, a services table including the following fields: 1) service ID, 2) service aggregate (if any), 3) name of service, 4) service attributes (e.g., port number, outside IP address, etc.), and a 5) default application traffic management policy. A service aggregate encompasses a combination of individual services (each including different matching criteria, such as different port numbers, etc.) corresponding to the service aggregate. When network traffic monitoring device 30 encounters a new flow, the service type identification modules of traffic classification engine 96 analyze the data flow against the service attributes in their respective services tables to identify a service ID corresponding to the flow. In one embodiment, traffic classification engine 96 may identify more than one service ID associated with the flow. In this instance, traffic classification engine 96 associates the more/most specific service ID to the flow. For example, network traffic associated with a peer-to-peer file sharing service may be identified according to a network protocol, such as TCP or HTTP traffic, as well as higher level, application-specific traffic types such as the actual file sharing application itself (e.g., Napster, Morpheus, etc.). In this instance, traffic classification engine 96 associates the flow with the most specific service ID. As a further example, an RTSP application data flow can be further classified to RTSP-Broadcast or RTSP-REALNET-TCP in the middle of the flow after a particular signature in the packets is encountered. In one implementation, traffic classification engine 96 writes the identified service type ID into the flow object corresponding to the data flow.

As discussed more fully below, service type identification, in one implementation, is a preliminary operation to the classification of a data flow according to the hierarchical traffic classification scheme configured by a network administrator. For example, a traffic class maintained by traffic classification engine 96 may be configured to include matching rules based on the service IDs in the services table. For example, a matching rule directed to HTTP traffic may simply refer to the corresponding service ID, as opposed to the individual attributes that the service type identification modules uses to initially identify the service. This implementation allows for a variety of hierarchical traffic classification configurations, such as the configuration of child traffic classes that further classify HTTP traffic on the basis of a network application, a range of IP addresses, a subnet, and the like. Still further, the service type identifiers can correspond to a specific network application (e.g., Napster, Citrix, NetIQ, Oracle, Skype, etc.)

and more generally to network protocols or services, such as IP, TCP, HTTP, SOAP, XML, UDP, FTP, SMTP, FTP, UDP, etc.

A traffic class comprises a set of matching rules or attributes allowing for logical grouping of data flows that share the same characteristic or set of characteristics. In one implementation, the matching rules can correspond to the service type identifiers discussed above, as well as other data flow attributes, such as the network interface on which the packets are received by application traffic management device, whether the server is the inside or outside host (see above), non-standard and standard port numbers, host IP address or subnet, MAC address, application-specific strings, diffserv codes, MPLS tags, VLAN tags, and the like. In one embodiment, each traffic class has at least one attribute defining the criterion(ia) used for identifying a specific traffic class. In one implementation, the attributes defining a given traffic class can be based on explicitly presented attributes of one or more packets corresponding to a data flow (as discussed above), or be based on behavioral attributes of the end systems associated with the flow. The U.S. patent applications identified above disclose various network traffic classification mechanisms that can be incorporated into embodiments of the present invention. For example, a traffic class can be defined by configuring an attribute defining a particular IP address or subnet. Of course, a particular traffic class can be defined in relation to a plurality of related and/or orthogonal data flow attributes. U.S. Pat. Nos. 6,412,000 and 6,591,299, and U.S. patent application Ser. No. 10/039,992 describe some of the data flow attributes that may be used to define a traffic class, as well as the use of hierarchical classification structures to associate traffic classes to data flows. In one embodiment, network traffic monitoring device 30 includes functionality allowing for classification of network traffic based on information from layers 2 to 7 of the OSI reference model. Network traffic monitoring device 30 can be configured to include matching rules that define a plurality of network applications commonly found in enterprise networks, such as database applications, Citrix® flows, ERP applications, and the like.

In one embodiment, network traffic monitoring device 30 is configured to include a predefined set of traffic classes based upon a knowledge base gleaned from observation of common or known traffic types on current networks. Network traffic monitoring device 30, in one embodiment, also allows an administrator to manually create a traffic class by specifying a set of matching attributes. As discussed above, administrator interface 150, in one embodiment, allows for selection of a traffic class and the configuration of traffic management and/or measurement policies for the selected traffic class. Administrator interface 150, in one embodiment, also allows for the selection and arrangement of traffic classes into hierarchical reference trees. Furthermore, network traffic monitoring device 30 may also include traffic class discovery functionality that automatically adds traffic classes to traffic classification engine 96 in response to data flows traversing the device. Automatic network traffic discovery and classification is disclosed in U.S. Pat. Nos. 6,412,000, 6,457,051, and 6,591,299, which are incorporated herein by reference.

Traffic classification engine 96, in one implementation, stores traffic classes associated with data flows that traverse access link 21. Traffic classification engine 96, in one embodiment, stores the traffic classes and corresponding data (e.g., matching rules, policies, partition pointers, etc.) related to each traffic class in a hierarchical tree. This tree is organized to show parent-child relationships that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. U.S. application Ser. No. 10/334,467, as well as other patents and patent applications identified above, disclose how traffic classification engine 96 traverses the hierarchical tree to match a data flow to a leaf traffic class node.

In one embodiment, the root traffic classifications are "/Inbound" and "/Outbound" data flows. Any data flow not explicitly classified is classified as "/Inbound/Default" or "/Outbound/Default". A "LocalHost" traffic class, in one implementation, corresponds to packets and data flows destined for network traffic monitoring device 30, such as requests for stored measurement data, or device configuration changes. In one embodiment, traffic classification engine 96 attempts to match to a leaf traffic class node before proceeding to remaining traffic class nodes in the hierarchical configuration. If a traffic class is found, the traffic classification engine 96 stops the instant search process and returns the identified traffic classification. Of course, one skilled in the art will recognize that alternative ways for traversing the hierarchical traffic class configuration can be implemented. For example, traffic classification engine 96 may be configured to traverse all traffic class nodes at a given level before proceeding to lower levels of the traffic classification tree.

In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree. Network traffic monitoring device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type. In one embodiment, each traffic class node includes a traffic class identifier; at least one traffic class (matching) attribute; at least one policy parameter (e.g., a bandwidth utilization control parameter, a security policy parameter, a measurement tagging policy, etc.), a pointer field reserved for pointers to one to a plurality of child traffic classes. In one embodiment, traffic classification engine 96 implements a reference tree classification model wherein separate traffic classification trees can be embedded in traffic class nodes of a given traffic classification tree. U.S. application Ser. No. 10/236, 149, incorporated by reference herein, discloses the use and implementation of embeddable reference trees.

A.3. Measurement Engine

Measurement engine 140 measures and collects data based on the number, rate and/or attributes of the packets traversing network traffic monitoring device 30. In one implementation, measurement engine 140 executes a set of measurement policies that control the granularity with which measurement data is collected and stored. Measurement engine 140, in one implementation, allows for measurement data to be collected on a very granular level, such as a half flow (i.e., the transmission of packets in one direction between two hosts over a transport layer connection associated with a given port) to a very granular level, such as the data flows corresponding to a given network application.

In one implementation, the measurement engine 140 operates as a background process that derives and collects data based on packets observed in the packet processing path in a measurement cache. In one implementation, the measurement cache is a table (or other suitable data structure) stored in the volatile memory of network traffic monitoring device 30. In one implementation, the measurement engine collects measurement data in the measurement cache and periodically writes the stored measurement data to a persistent data store. In one embodiment, measurement engine 140 maintains measurement values in volatile memory and, at periodic intervals, stores the data in persistent memory, such as a hard drive, with a time stamp. In one implementation, measurement engine 140 operates in connection with two measurement cache tables. During a first interval, measurement engine 140 collects data into a first measurement cache table. At the end of the interval, the measurement engine 140 collects measurement data in a second measurement cache table, and writes the contents of the first cache table to the persistent data store, clearing clears the measurement values in the cache table after the write operation has been performed. Measurement engine 140 switches between the cache tables in this manner at each successive sampling interval. In one embodiment, measurement engine 140 stores network statistic data in persistent memory at one-minute intervals; however, other suitable time intervals can be chosen as a matter of engineering design or administrative need. In addition, the persistent memory, in one embodiment, includes sufficient capacity to store a large amount of network management data, such as data for a period of 24, 48, or 72 hours. In one embodiment, the time interval at which measurement engine 140 stores network management data in persistent memory is a configurable parameter.

In one implementation, measurement engine 140 maintains for each entry in the measurement cache the following measurement variables and/or statistics: 1) packet count, 2) number of bytes, 3) number of new flows, 4) number of dropped packets, 5) number of initiated TCP connections, 6) peak number of concurrent TCP connections, 7) number of exited TCP connections, 8) number of aborted TCP connections, 9) number of retransmitted bytes, and 10) count of retransmitted packets. The measurement engine 140 may also maintain a variety of other measurement variables, such as average rate in bits per second (bps), peak rate (bps), etc.

In one implementation, the measurement engine 140 observes a packet on the processing path, and identifies a flow that corresponds to the packet. Based on attributes of the flow and/or packet, the measurement engine 140 creates a measurement cache key, as discussed more fully below, and uses the measurement cache key as an index into the measurement cache. If a matching measurement cache entry is found, measurement engine 140 updates the measurement variables corresponding to the entry based on attributes of the received packet (e.g., packet arrival time, size, etc.). However, if no match is found, measurement engine 140 creates a new entry in the measurement cache and populates the measurement fields accordingly.

As discussed above, a measurement cache key is created based on the measurement policies that have been configured and the attributes of the packet or flow. For example, measurement policies can be based on the following attributes or measurement axes: 1) service type identifier (see Section A.2., above), 2) initiator network address, 3) acceptor network address, 4) flow control policy identifier, 5) measurement tag, 6) ingress interface, 7) egress interface, and 8) port identifier. The initiator network address is the network address of the host that initiated the data flow. Conversely, the acceptor network address is the network address of the host that receives or accepts initiation of a data flow. The flow control policy identifier is an identifier corresponding to a flow control or bandwidth management policy associated with the flow. For example, a flow control policy identifier may correspond to a bandwidth partition or a rate control policy executed by flow policy module 94. The measurement tag is an identifier assigned by a process external to the measurement engine 140 that can tag various flows with a measurement tag identifier based on a rule set. Measurement tag identifiers and the corresponding rule sets can be used to group otherwise unrelated data flows for the purposes of applying measurement policy. Ingress interface is the identifier for the network interface (e.g., 71, 72) on which the packet was received. Egress interface is the identifier for the network interface on which the packet is to be transmitted. Port identifier, in one implementation, is the transport layer port identifier in the packet header. The present invention, however, is not limited to these measurement axes and can be modified to include fewer or additional measurement axes, such as traffic class identifiers, etc.

A measurement policy can be configured based on a selection one or more measurement axes discussed above. In addition, the measurement axes may be selected without configuration of a matching value (default) or with configuration of a matching rule (specific). For example, a network administrator may define a measurement policy by selecting the service type identifier as a sole measurement axis using administrator interface 150 without specifying a matching rule or value for the measurement axis. In this didactic example, measurement engine 140 will create a measurement cache key based on the service type identifier contained in the flow object associated with the packet. If the measurement cache key does not match an existing entry in the measurement cache, measurement engine 140 creates a new entry. In this manner, measurement engine 140 creates a new entry for each new service type it encounters. A network administrator may also configure a more granular measurement policy. For example, a network administrator may select two measurement axes, such as service type identifier and initiator network address. In this didactic example, a measurement entry will be created for each unique service type identifier/initiator network address pair encountered in the data flows traversing network traffic monitoring device. As one will recognize, multiple flows may match a measurement cache entry and therefore affect the measurement variables for that entry. Measurement engine 140, in one implementation, creates a measurement cache key by concatenating the applicable measurement axis values and hashing the resulting string. The resulting hashed value is then used as a measurement cache key.

Still further, additional measurement policies may be configured, such as specific measurement policies where a given measurement axis also includes a matching rule. For example, a measurement policy may be configured by selecting the initiator network address measurement axis and configuring a matching rule with a network address range or subnet. The measurement engine uses a specific measurement policy to create a measurement cache key if the attributes of the packet or corresponding flow satisfy the matching rule(s) associated with the measurement policy. In one implementation, measurement engine 140 is configured with both default and specific measurement policies. In one implementation, if a packet or flow satisfies a specific measurement policy, measurement engine 140 applies it; otherwise, the default measurement policy is applied. Although a flow may match both a specific measurement policy and a default measurement policy, in one implementation, only one entry is created in the measurement cache. The more granular collected measurement data can be aggregated by a network management system or reporting tool to view the data from a variety of desired perspectives.

Figure 3:
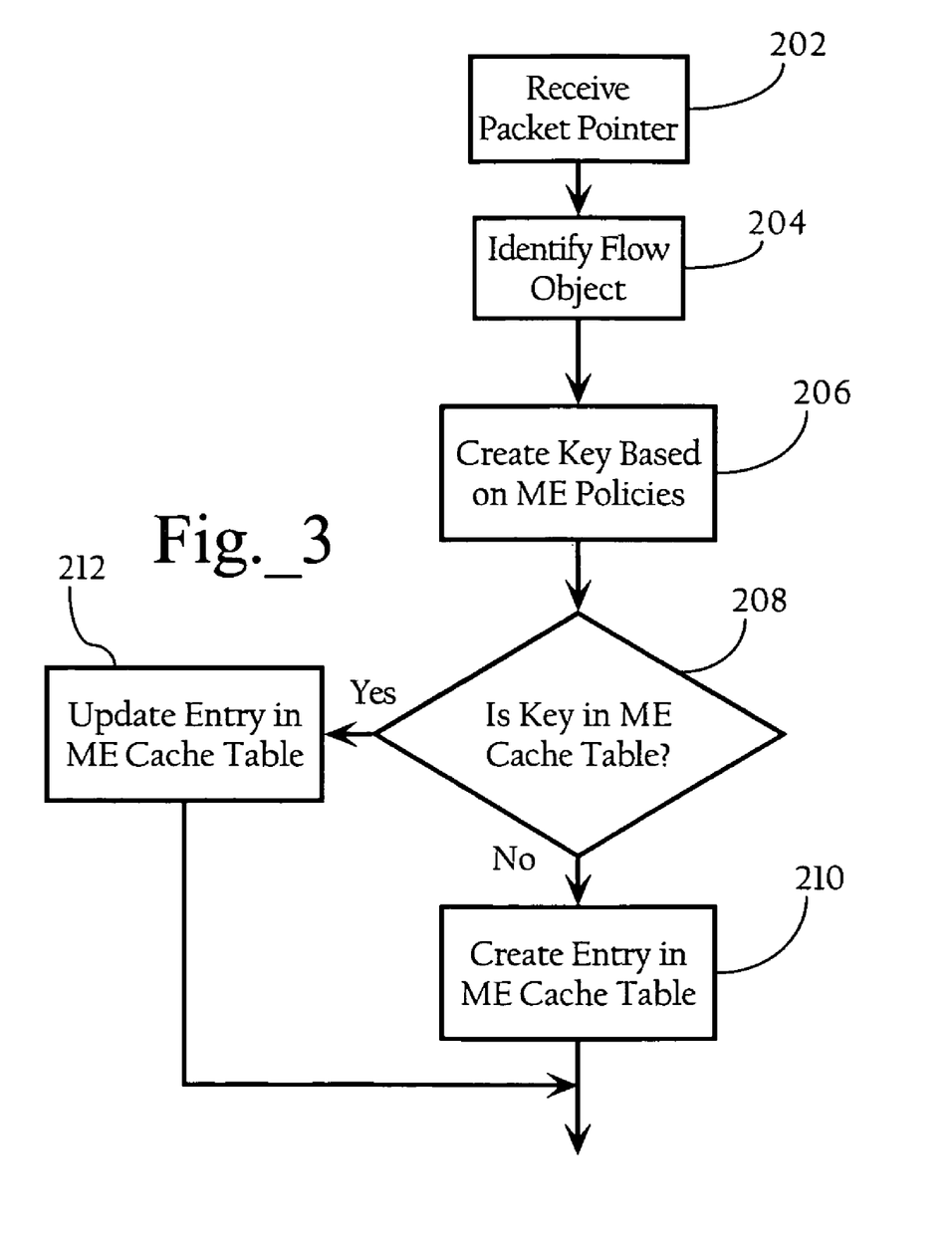
FIG. 3 is a flow chart diagram providing a process, according to one implementation of the invention, directed to processing packets and updating cached measurement engine data.

FIG. 3 illustrates a process executed by measurement engine 140 according to one embodiment of the present invention. As FIG. 3 illustrates, when measurement engine 140 receives a pointer to a packet (202), it identifies the flow object corresponding to the packet (204). Measurement engine 140 then creates a measurement cache key based on the measurement policy(ies) and at least one attribute of the flow object (206), as discussed herein. Measurement engine 140 then looks up the measurement cache key against the measurement cache (208). If a matching entry in the measurement cache is found, measurement engine 140 updates the measurement variables corresponding to the entry based on attributes of the packet (212). Otherwise, measurement engine 140 creates a new entry in the measurement cache (210).

Figure 4:
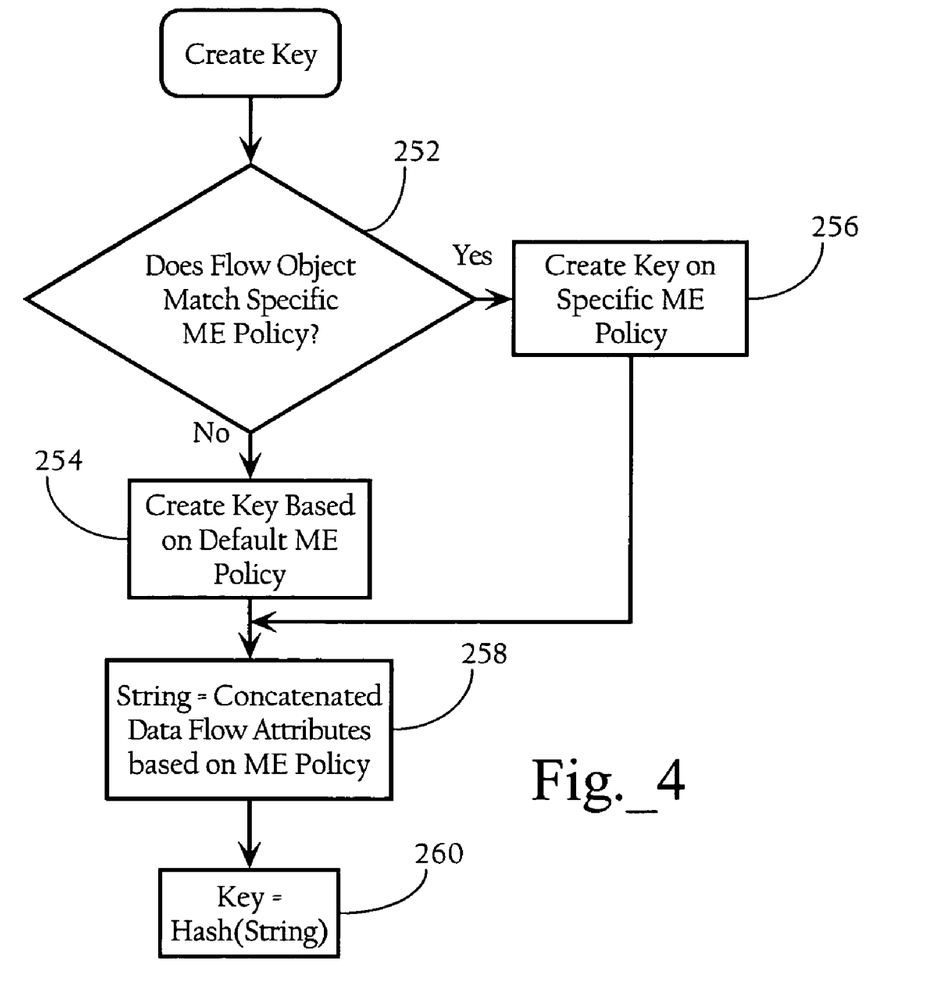
FIG. 4 is a flow chart diagram illustrating the selection of a measurement engine policy to apply to a packet.

FIG. 4 provides a process, executed by measurement engine 140, directed to creating a measurement cache key. As FIG. 4 illustrates, measurement engine 140 first identifies the appropriate measurement policy to apply (252). As discussed above, if the data flow corresponding to the received packet matches a specific policy, then measurement engine uses the specific measurement engine policy to create the measurement cache key (256). Otherwise, measurement engine 140 uses a default measurement policy (254). To create the key, measurement engine 140 concatenates the data flow attributes specified in the measurement policy to create a string (258) and hashes the resulting string (260). For didactic purposes, assume that the default measurement policy is based on the service type identifier axis and the initiator network address. If a data flow identified as HTTP traffic with an initiator network address of 1.1.1.1, measurement engine 140 would concatenate an identifier (such as a numeric code) corresponding to HTTP traffic with the network address (1.1.1.1) and hash the resulting string to create the key. In one implementation, the ordering of measurement axes to create the string is based on a predetermined list or ordering system. A suitable hashing algorithm to create the measurement cache key is the MD5 hash algorithm.

As one skilled in the art will recognize, measurement cache entries are dynamically created based on configured measurement policy. The present invention also allows for dynamic creation of measurement policy without having to reset the measurement entries. This allows for a variety of useful features. For example, an adaptive response mechanism can create a specific measurement policy that collects measurement data for a specific host that has been identified as possibly being infected with a virus, or possibly executing a peer-to-peer file sharing client. The newly configured, specific measurement policy can also be deleted without having to reset the measurement cache or other data structures.

Lastly, although the present invention has been described as operating in connection with end systems and networks employing the TCP, IP and Ethernet protocols, the present invention has application in computer network environments employing any suitable transport layer, network layer and link layer protocols. Furthermore, the measurement functionality according to the present invention can be incorporated into a variety of network devices, such as application traffic management systems, gateways, packet capture devices, firewalls, and the like. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A method for recording network traffic data, comprising:
   maintaining, in a memory of a network device, a measurement data structure including at least one entry and a corresponding measurement key, wherein the at least one entry comprises at least one measurement attribute;
   receiving, at the network device, a packet having a plurality of packet attributes;
   associating the packet to a data flow by hashing a plurality of packet attributes of the packet to create a first flow key and matching the first flow key to a second flow key associated with a data flow object of a plurality of data flow objects, wherein each data flow object includes a plurality of data flow attributes, and adding a new data flow object that includes the first flow key to the plurality of data flow objects, if the packet does not match any data flow objects of the plurality of data flow objects;
   selecting, based on one or more data flow attributes of the data flow object corresponding to the data flow, a measurement engine policy from a plurality of measurement engine policies;
   creating a second measurement key for the packet based on the selected measurement engine policy and at least one of the plurality of data flow attributes, wherein the plurality of packet attributes used to create the first flow key and the at least one of the data flow attributes used to create the second measurement key differ by at least attribute; and
   matching the second measurement key to an entry in a measurement data structure; and
   if a matching entry is found, updating a measurement value of the entry based on the packet;
   if no matching entry is found, creating a new entry in the measurement data structure.

2. The method of claim 1 wherein a first measurement engine policy of the plurality of measurement engine policies is applied by default if no other measurement engine policy is specifically identified.

3. The method of claim 1 wherein the measurement policy identifies at least one measurement axis.

4. The method of claim 3, wherein the at least one measurement axis is one selected from a group consisting of a service type identifier, an initiator network address, an acceptor network address, a flow control policy identifier, a measurement tag, an ingress interface, an egress interface, and a port identifier.

5. The method of claim 2, wherein the measurement policy identifies at least one measurement axis, wherein the selecting step comprises comparing the at least one measurement axis to corresponding attributes of the data flow object.

6. The method of claim 1 wherein the creating step comprises concatenating, based on the measurement policy, a plurality of attributes in the data flow object; and
   hashing the concatenated attributes to create the second measurement key.

7. The method of claim 3 wherein the creating step comprises
   concatenating, based on the at least one measurement axis identified in the measurement policy, a plurality of attributes in the data flow object; and
   hashing the concatenated attributes to create the second measurement key.

8. The method of claim 1 further comprising
periodically writing the data in the measurement data structure to a persistent data store; and
clearing the measurement data structure.

9. The method of claim 1 wherein the measurement data structure comprises a table.

10. The method of claim 9 wherein the second measurement key is an index to the entries in the table.

11. An apparatus for recording network traffic data, comprising:
a processor;
at least one network interface,
a memory, the memory comprising a measurement data structure, and at least one data flow object;
a software application, physically stored in the memory, comprising instructions operable to cause the processor and the apparatus to:
receive a packet having a plurality of packet attributes;
associate the packet to a data flow by hashing a plurality of packet attributes of the packet to create a first flow key and matching the first flow key to a second flow key associated with a data flow object in the memory, wherein the data flow object includes a plurality of data flow attributes, and adding a new data flow object that includes the first flow key in the memory, if the packet does not match any data flow objects existing in the memory;
select, based on one or more data flow attributes of the data flow object corresponding to the data flow, a measurement engine policy from a plurality of measurement engine policies;
create a measurement key for the packet based on the selected measurement engine policy and at least one of the plurality of data flow attributes, wherein the plurality of packet attributes used to create the first flow key and the at least one of the data flow attributes used to create the measurement key differ by at least attribute; and
match the measurement key to an entry in a measurement data structure; and
if a matching entry is found, update a measurement value in the entry based on the packet;
if no matching entry is found, create a new entry in the measurement data structure.

12. The apparatus of claim 11 wherein the software application further comprises instructions operative to cause the processor to
select a first measurement engine policy of the plurality of measurement engine policies by default if no other measurement engine policy is specifically identified.

13. The apparatus of claim 11 wherein the measurement policy identifies at least one measurement axis.

14. The method of claim 13, wherein the at least one measurement axis is one selected from a group consisting of a service type identifier, an initiator network address, an acceptor network address, a flow control policy identifier, a measurement tag, an ingress interface, an egress interface, and a port identifier.

15. The apparatus of claim 12, wherein the measurement policy identifies at least one measurement axis, wherein to select the measurement policy, the software application further comprises instructions operative to cause the processor to compare the at least one measurement axis to corresponding attributes of the data flow object.

16. The apparatus of claim 11 wherein to create the measurement key, the software application further comprises instructions operative to cause the processor to
concatenate, based on the measurement policy, a plurality of attributes in the data flow object; and
hash the concatenated attributes to create measurement key.

17. The apparatus of claim 13 wherein to create the measurement key, the software application further comprises instructions operative to cause the processor to
concatenate, based on the at least one measurement axis identified in the measurement policy, a plurality of attributes in the data flow object; and
hash the concatenated attributes to create measurement key.

18. The apparatus of claim 11 further comprising a persistent data store, and wherein the software application further comprises instructions operative to cause the processor to
periodically write the data in the measurement data structure to a persistent data store; and
clear the measurement data structure.

19. The apparatus of claim 11 wherein the measurement data structure comprises a table.

20. The apparatus of claim 19 wherein the measurement key is an index to the entries in the table.

* * * * *